Nov. 27, 1951  A. C. RUGE  2,576,417
COLUMN TYPE FORCE MEASURING DYNAMOMETER
Filed Feb. 17, 1949
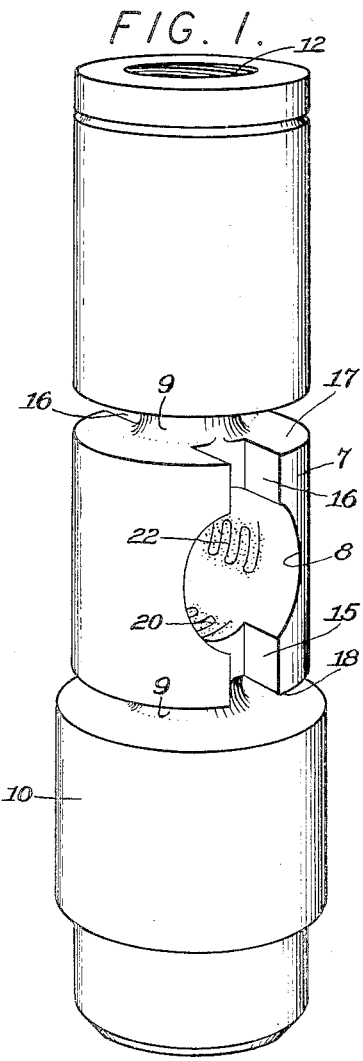
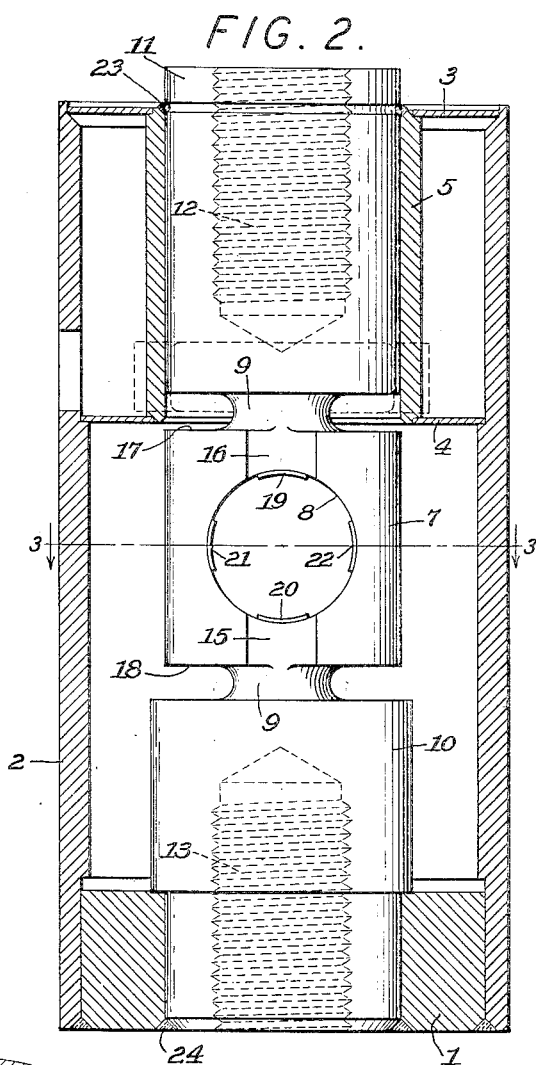
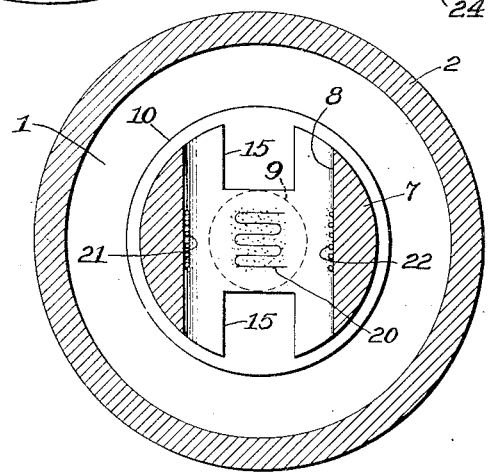
INVENTOR
ARTHUR C. RUGE
BY
ATTORNEY Patented Nov. 27, 1951

2,576,417

UNITED STATES PATENT OFFICE 2,576,417

COLUMN TYPE FORCE MEASURING DYNAMOMETER

Arthur C. Ruge, Cambridge, Mass., assignor to Baldwin-Lima-Hamilton Corporation, a corporation of Pennsylvania Application February 17, 1949, Serial No. 76,958

11 Claims. (Cl. 201—63)

This invention relates generally to a load weighing unit of the type employing a load-sensing strain responsive element that is especially adapted for weighing either tension or compression loads, and relates more particularly to a unit of the foregoing type having a cylindrical column type strain responsive element employing electrical strain gages to measure the load in terms of the resulting strain.

In my copending application filed of even date herewith, Serial No. 76,957 (now Patent #2,561,318, issued July 17, 1951) I disclose a tension or compression load weighing unit of a type that is especially adapted for relatively small loads, particularly where it is desirable to have minimum overall deflection together with a high degree of strain sensitivity and a consequent large electrical output of the gages. While these and other desirable results, including economical manufacture, arise from certain peculiar structural and functional features of the device disclosed in my said copending application, yet those structural features cannot be employed in a large load capacity unit without making it excessively costly to manufacture. In the past, these difficulties have been overcome in large capacity units by using weighing members subjected to direct tension or compression stress but these members have been of such a nature as to entail sacrifice of the desirable results of my above mentioned small capacity units as will be seen from the following description of my present invention. In my present invention, the many desirable results of the low capacity device of my said copending application can be effectively obtained in a large capacity column type unit without incurring the disadvantages of excessive size or cost.

It is an object of my invention to provide an improved large capacity column type load weighing device that has minimum overall deflection combined with a high degree of strain sensitivity and electrical gage output while providing a desired factor of safety and economy of material and manufacturing cost.

I have found that the foregoing as well as other objects of the invention can be obtained by employing a load sensing column that is cylindrical about a load applying axis and then effecting a peculiar structural relationship therein by the provision of a transverse hole. To this, I may add the further structural and functionally cooperating feature of strain concentrating recesses preferably in the form of axially extending slots extending from the hole to circular necked-down load transmitting sections at each end of the cylindrical element. While this specific embodiment has a resulting peculiar form, yet the machining operations for forming it are relatively simple and the material is economically employed, thereby keeping its cost to a minimum while its functioning is conducive to weighing large loads with a high degree of strain concentration and sensitivity combined with ruggedness, complete safety, and minimum overall deflection of the device.

Other objects and advantages will be more apparent to those skilled in the art from the following description of the accompanying drawings in which:

Fig. 1 is a perspective of my improved load sensing element;

Fig. 2 is a sectional view of a complete load weighing unit embodying the load sensing unit which is shown in elevation; and Fig. 3 is a horizontal section on the line 3—3 of Fig. 2.

In the specific embodiment of the invention which is disclosed herein merely for purposes of illustration, I have shown a base 1, a rigid cylindrical shell 2 suitably secured to the base as by welding or other means, and a pair of annular diaphragms 3 and 4 connecting the shell to a sleeve 5. The structure thus described is similar to that shown in my copending application. My improved load sensing element is made, preferably, from a single cylindrical piece of steel, or other suitable material, machined to form a cylindrical strain responsive portion 7 through which a transverse circular hole 8 extends in substantially symmetrical relation to the portion 7, whereby the axes of the hole and column intersect. The strain responsive portion is connected by preferably circular necked-down sections 9 to load applying ends 10 and 11, these ends being here shown of relatively large diameter so as to have threaded recesses 12 and 13 for receiving load applying bolts or the like. Sections 9 can be of other shape in cross section, for example, rectangular, oval, etc., the effective shape depending primarily upon the dimension of the projection shown in Fig. 2 relative to the size of hole 8. The ends 10 and 11 are suitably engaged by base 1 and sleeve 5 thereby permitting the diaphragms 3 and 4 to laterally guide the load sensing column without friction as it deflect axially under load and prevent transmission of eccentric and lateral forces thereto. Preferably, member 11 is a press fit into sleeve 5 and a bead of solder 23 forms an hermetic seal at the juncture of the two. Member 10 is preferably press fitted into base 1 and may be welded to it by bead 24 if additional strength is required. As is shown, particularly in Fig. 1, the cylindrical strain reponsive portion 7 has axially extending slots 15 and 16 extending from transverse bore 8 to the ends 17 and 18 of the portion 7. Similar slots provided on the diametrically opposite side of member 7 are given identical reference numbers. In the specific disclosure hereof, the depth of the axial slots extends to coincide with the minimum diameter of necks 9, although this depth may vary in accordance with the load capacity and strain sensitivity desired. Strain gages 19, 20, 21 and 22, are preferably placed diametrically opposite to each other on the surface of bore 8 where localized strain concentrations are created as a result of my improved construction. The strain concentration areas of gages 19 and 20 are axially diametrically opposed, i. e., lie along the axis of the cylindrical column-like member 7, while the areas of gages 21 and 22 are laterally diametrically opposed, i. e., lie in a lateral plane normal to the column axis. For tension loads, the strains at gage locations 21 and 22 will be in tension and the strains at gage locations 19 and 20 will be in compression, and vice versa for compression loads. The gages preferably constitute arms of a usual Wheatstone bridge so that maximum electrical output is obtained for a given load and temperature compensation is inherent.

In order to obtain the maximum possible output from such a bridge circuit consistent with optimum safety factor and minimum overall deflection, it is necessary that the strains in gages 19 and 20 be equal in magnitude but opposite in sign to the strains in gages 21 and 22. Gages 19 and 20 form opposite arms of a Wheatstone bridge and gages 21 and 22 form the remaining pair of opposite arms. This strain condition I accomplish by proper selection of the dimensions of the necked-down load-transmitting sections 9 and by cutting suitable slots 15 and 16 so as to make the concentration of stress substantially equal at all four gage points, all in the manner herein described. The neck portion can be employed without the slots. The normal procedure is to make the neck or reduced sections as small in size as is consistent with the load-carrying capacity of the device, it being important, of course, that the stresses there do not exceed those at the gaged areas in order that the safety factor be at a maximum, and also that the bridge output is at a maximum.

The proportions of the slots are not critical, the width of slots 15 and 16 being usually determined by choice of a convenient width of milling cutter. In the practical design of these devices data are accumulated by a cut-and-try process and by interpolation or extrapolation from established designs. It will be seen that, once the bore 8 has been gaged, the necks and slots can be machined in progressive steps, strain readings being taken on the gages between steps of cutting. By tabulating or plotting the resulting data the final design is quickly arrived at by extrapolation.

Within the limitations of practical size, economy, etc., it will be seen that, once a suitable design is established for a given load, other load capacities can be designed for merely by making the load-responsive elements geometrically similar to the established design and by applying the well-known principles of similitude for calculating the scale ratios for the desired capacities. For production purposes, I prefer to use a standard size hole 8 for all capacities from 10,000 to 50,000# since my gaging fixtures and procedure are thus simplified. Also, I can fit more than one capacity of sensing element into a given outer assembly, thus effecting further economies and speed of production.

The configuration of member 7, as brought about by the intersection of transverse hole 8 with the cylindrical nature of member 7 and by the action of necked portions 9, provides the desired degree of strain concentration for gages 21 and 22, but to bring the gages 19 and 20 into complete cooperative relationship to the other gages in order to obtain maximum sensitivity and gage output, I provide the slots 15 and 16 which might be termed "strain concentrating recesses." These cut-away recesses by being of suitable depth permit the strain concentrations at the four diametrically opposite points of the hole to be substantially equal. By having the gage area of substantially the same degree of strain concentration for a given load, it is possible, as pointed out above and in my said copending application, to connect the gages in a Wheatstone bridge so as to obtain much greater electrical output from the gages than would otherwise be possible in a simple direct stress type load weighing unit such as a column or tension bar. The diameter of the necked-down portions 9 and the depth of the slots 15 and 16 may be readily determined for producing the desired strain equality. This is done by first drilling the hole 8 of whatever diameter will produce a desired degree of strain concentration for given loads at gages 21 and 22, consistent with leaving a necessary minimum cross-sectional area of member 7 for safety purposes, and then alternately applying loads to the load sensing column and removing metal from the slots and necks until the strain at gages 19 and 20 are substantially equal to the strain at gages 21 and 22. The strains are measured, of course, by the use of gages in their indicated positions. While a high degree of strain concentration is obtained at the four gage areas, it will be noted that the portions of member 7 between the gage areas are relatively heavy and unyielding, thereby minimizing the overall deflection of the device under load.

While the guiding principles for the construction and operation of my device have been fully set forth, yet, for purposes of illustration the specific dimensions for an "RDS Carpenter" steel column of one capacity (40,000 lbs.) will be given. The load sensing column 7 is 2⅝" for both diameter and length, hole 8 is 1⅝" diameter symmetrically positioned in the column, necked-down portions 9 are 1⅛" at their minimum diameter, while their length which is of less importance is ⅜", and the ends 11 and 10 are respectively 2⅝" and 2 ⅞" diameter, which is important only for providing adequate size for supporting tension bolts in holes 12 and 13. Slots 15 and 16 are ½" wide and the bottom of the slots is tangent to the smallest diameter of the neck 9.

While I have described a specific and somewhat elaborate form of my invention which is peculiarly well-adapted for load cell construction, I wish to point out that the broader aspects of its form, comprising a cylindrical load-sensing element having a transverse hole for providing stress concentrations for highly sensitive strain gage measurement of the load with accompanying minimum overall deflection, is by itself valuable and practical. This broad form can be used without the necked load-transmitting members 9 and without the slots 15 and 16 and, although the gage bridge output will be somewhat less for a given load and safety factor, still it has very substantial advantages over load-sensing devices which have been used in the past.

Consider, for example, a cylindrical member having such a transverse hole in which gages are applied, as would be exemplified by Fig. 1 with necks and slots omitted. It may be seen that such a structure is very rugged and strong against eccentric load and bending while at the same time having a high concentration of stress at gage areas 21 and 22 together with minimum overall deflection. The stress at gage areas 19 and 20 would be smaller than that at areas 21 and 22 but still would be substantial and the gage stresses would be respectively at the same signs as in the design actually shown in Fig. 1. Therefore a good bridge output would be obtained, and, of course, the temperature compensation of the gages against each other would be inherent as in the Fig. 1 structure which is one of the important features of the invention. In contrast to my structure, to design a simple compression or tension member having equal stress for the same load would result in a structure relatively weak against eccentric load and bending and which would therefore be of much more limited usefulness.

Such a simplified form of my invention is obviously much cheaper to build and would have many practical uses, as for example in a crane scale or other simple dynamometer. The outer shell structure and diaphragm supports of Fig. 2 would not be needed since the sensing element is very rugged of itself. Also, the fact that the gages are placed inside the transverse hole is a very important point in favor of my structure when used as just described since the gages are protected against damage by the rugged structure itself. All that is needed is a simple cover to keep dirt and objects out of the hole, and the device is a complete precision load-weighing element.

From the foregoing disclosure, it is seen that I have provided a large capacity load weighing device that is applicable for either tension or compression load weighing, that can be made economically by simple machining operations and that is compact and rugged, combined with a high degree of sensitivity, accuracy and minimum overall deflection.

It will, of course, be understood that various changes in details of construction and arrangement of parts may be made by those skilled in the art without departing from the spirit of the invention as set forth in the appended claims.

I claim:

1. A load weighing device comprising a member having a load sensitive column portion extending in the direction of an axis along which load is to be applied and end portions for transmitting such axial load to the sensitive column, said load sensitive column portion being cylindrical about the axis along which load is applied and having a transverse hole with substantially diametrically opposed areas at which strain concentration occurs in response to load, and electrical impedance strain gage means secured to one of said diametrically opposed areas for measuring the surface strain thereof as an index of the applied load.

2. The combination set forth in claim 1 further characterized in that two of the diametrically opposed areas are disposed on the cylinder axis, and said column has a strain concentrating recess adjacent one of said two opposed areas so as to reduce the size of said areas and thereby augment the strain concentration at said adjacent area.

3. A load weighing device comprising a member having an axially extending load sensitive column-like portion and end portions for transmitting such axial load to the sensitive column, the load sensitive column portion being cylindrical about the axis along which load is applied, said column also having a transverse hole with both axially and laterally disposed substantially diametrically opposed areas at which strain concentration occurs in response to load, and electrical impedance strain gage means secured to one of said diametrically opposed areas for measuring the surface strain thereof as an index of the load.

4. The combination set forth in claim 3 further characterized in that the column has strain concentrating recesses adjacent each of said axially disposed areas so as to reduce the size of said areas and thereby effect a predetermined relation to strain concentrations at the axially and laterally opposed areas.

5. The combination set forth in claim 3 further characterized in that the column has axially extending slots in the column periphery of such depth as will effect a predetermined relation of strain concentrations between the axially and laterally disposed areas.

6. The combination set forth in claim 3 further characterized by the provision of a load transmitting element adjacent to one end of the column, said element being axially located and of a radial extent smaller than that of said cylindrical column.

7. The combination set forth in claim 3 further characterized by the provision of a load transmitting element adjacent to one end of the column, and said column having strain concentrating axially extending slots adjacent the load transmitting element, said slots extending from the transverse hole to the ends of the column and being disposed one at each end of the hole.

8. The combination set forth in claim 1 further characterized in that said load transmitting elements are provided at each end of the column and substantially larger load connecting members are connected to said elements and extend axially of the load column for receiving loads applied to said device.

9. A load weighing device comprising an integral cylindrical member having a pair of annular grooves to divide the cylindrical member into an intermediate load sensing column and two end load engaging members, and said column portion having a transverse hole whose axis substantially intersects the axis of the cylindrical member and having axially extending slots extending radially inwardly from the periphery of the column and extending axially from both ends of the transverse hole to the pair of annular grooves so that the areas of the hole surfaces adjacent the two end load engaging members is reduced to a value that effects substantially equal degrees of strain concentration at axially and laterally disposed diametrically opposed areas of the hole, an electrical strain gage means mounted on said diametrically opposed areas for measuring the surface strain thereof as an index of the applied load.

10. The combination set forth in claim 1 further characterized in that said load transmitting elements are provided at each end of the column and substantially larger load connecting members are connected to said elements and extend axially of the load column for receiving loads applied to said device, a base, a cylindrical shell secured to said base for containing said cylindrical member, said base engaging one of said end load engaging members, and an annular diaphragm connecting said cylindrical shell with the periphery of the other end load engaging member whereby said device is guided axially without friction.

11. The combination set forth in claim 1 further characterized in that said load transmitting elements are provided at each end of the column and substantially larger load connecting members are connected to said elements and extend axially of the load column for receiving loads applied to said device, a base, a cylindrical shell secured to said base for containing said cylindrical member, an axial opening in said base for receiving one of the cylindrical end portions so that it is directly accessible from the exterior, a pair of annular diaphragms connecting said cylindrical shell with the periphery of the other cylindrical end portion whereby the latter is guided axially and is also directly accessible from the exterior for application of load thereto, and said cylindrical end portions being adapted to transmit tension and compression loads to the device.

ARTHUR C. RUGE.

REFERENCES CITED

The following references are of record in the file of this patent:

UNITED STATES PATENTS

| Number | Name | Date |
| --- | --- | --- |
| 2,405,199 | Faust et al. | Aug. 6, 1946 |
| 2,414,161 | Moore | Jan. 14, 1947 |
| 2,421,222 | Schaevitz | May 27, 1947 |
| 2,440,706 | Tint | May 4, 1948 |
| 2,488,349 | Thurston | Nov. 15, 1949 |

OTHER REFERENCES

Van Leeuwen et al., "Resistance Wire Strain Gage Applications and Circuits," July 1945, pages 443–449 of Product Engineering. (Page 448 relied upon.)